United States Patent
Singh et al.

(10) Patent No.: US 12,405,887 B2
(45) Date of Patent: Sep. 2, 2025

(54) METHOD AND DATA STORAGE DEVICE FOR MANAGING HOST REQUESTS IN DATA STORAGE DEVICE

(71) Applicant: SAMSUNG ELECTRONICS CO., LTD., Suwon-si (KR)

(72) Inventors: Abhinav Kumar Singh, Bengaluru (IN); Saugata Das Purkayastha, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/205,106

(22) Filed: Jun. 2, 2023

(65) Prior Publication Data
US 2024/0330176 A1 Oct. 3, 2024

(30) Foreign Application Priority Data
Mar. 31, 2023 (IN) .............................. 202341024577

(51) Int. Cl.
*G06F 12/02* (2006.01)

(52) U.S. Cl.
CPC .. *G06F 12/0292* (2013.01); *G06F 2212/1024* (2013.01)

(58) Field of Classification Search
CPC ...................... G06F 12/0292; G06F 2212/1024
See application file for complete search history.

(56) References Cited

U.S. PATENT DOCUMENTS

| | | | | |
|---|---|---|---|---|
| 2009/0259800 A1* | 10/2009 | Kilzer | .................. | G06F 12/0246 711/E12.008 |
| 2015/0127882 A1 | 5/2015 | Carlson et al. | | |
| 2019/0251039 A1 | 8/2019 | Modi et al. | | |
| 2019/0370167 A1 | 12/2019 | Widder et al. | | |
| 2020/0004540 A1* | 1/2020 | Navon | .................. | G06F 9/3832 |
| 2020/0034298 A1 | 1/2020 | Benitsy et al. | | |
| 2022/0155998 A1* | 5/2022 | Muthiah | .................. | G06F 12/10 |
| 2022/0382487 A1* | 12/2022 | Palmer | .................. | G06F 3/0659 |
| 2024/0061769 A1* | 2/2024 | Narum | .................. | G06F 12/0292 |

OTHER PUBLICATIONS

Basak, Jayanta et al., "Storage Workload Identification", ACM Transactions on Storage, vol. 12, No. 3, Article 14, May 2016., pp. 14:1-14:30.
Ae, Jin et al., "Efficient Garbage Collection Algorithm for Low Latency SSD", Electronics 2022, vol. 11, No. 1084, Mar. 30, 2022, pp. 1-14, https://doi.org/10.3390/electronics11071084.
Communication dated Feb. 2, 2024, issued by European Patent Office in European Patent Application No. 23192900.1.

* cited by examiner

*Primary Examiner* — Tracy A Warren
(74) *Attorney, Agent, or Firm* — Sughrue Mion, PLLC (57) ABSTRACT

The disclosure relates to a method and data storage device for managing host requests in the data storage device. The method includes receiving, from a host device, a read request for reading data from the data storage device, identifying a type of the read request, and based on the type of the read request being a random read request, performing one or more first operations related to processing of the read request in parallel with one or more second operations including: fetching a logical block address of the data from the read request; and obtaining a logical-to-physical (L2P) mapping table from a first memory associated with the data storage device, based on the logical block address, the L2P mapping table used for reading the data from the data storage device.

19 Claims, 5 Drawing Sheets

METHOD AND DATA STORAGE DEVICE FOR MANAGING HOST REQUESTS IN DATA STORAGE DEVICE

CROSS-REFERENCE TO RELATED APPLICATION

This application is based on and claims priority from Indian Patent Application No. 202341024577, filed on Mar. 31, 2023, in the Indian Intellectual Property Office, the entirety of which is hereby incorporated by reference.

BACKGROUND

1. Field

The disclosure generally relates to data storage devices. More particularly, the disclosure relates to a method and a data storage device for managing host requests in the data storage device.

2. Description of Related Art

Data storage devices store data and instructions to be processed in a computer system. These data storage devices may include a solid state drive (SSD), a hard disk drive (HDD), and the like. There are two kinds of read operations in the SSD including a sequential operation and a random operations. The sequential read operation includes reading from blocks of data. The random read operation includes reading or writing small files which may be scattered throughout the SSD.

The reading of the data of a host device from the data storage device includes fetching a logical-to-physical (L2P) mapping table from a memory of the data storage device to identify a physical address of the data. Typically, this causes a delay in reading the data for the random read operation. In the random read operation, the L2P mapping table is extracted multiple times based on a read request from the host device, leading to additional costs in loading the L2P mapping table. The L2P mapping table may not be available in cache and the L2P mapping table has to be extracted from the memory for every read request. In most cases, a storage may not be available for caching entire L2P mapping in the memory. The random read operation includes a latency caused by a time to fetch the read request, decode logical page numbers (LPNs) of the read request, load the L2P mapping table, load the data from the memory, and transfer the data to the host device.

SUMMARY

According to an aspect of the disclosure, there is provided a method for managing host requests in a data storage device, the method including: receiving, from a host device, a read request for reading data from the data storage device; identifying a type of the read request; and based on the type of the read request being a random read request, performing one or more first operations related to processing of the read request in parallel with one or more second operations including: fetching a logical block address of the data from the read request; and obtaining a logical-to-physical (L2P) mapping table from a first memory associated with the data storage device, based on the logical block address, the L2P mapping table used for reading the data from the data storage device.

The read request may be stored in a queue in one of a second memory associated with the host device and the first memory associated with the data storage device.

The performing the one or more first operations related to processing of the read request may include performing pre-defined processing of the read request including validation of the read request and allocating one or more resources to the read request.

The logical block address may include a start logical block address (LBA) and a number of logical blocks (NLB) of the data.

The obtaining the L2P mapping table from the first memory associated with the data storage device may include: converting the logical block address to a logical page number (LPN); and obtaining, based on the LPN, the L2P mapping table from the first memory associated with the data storage device.

The method may further include: based on the L2P mapping table being obtained, fetching the data from the data storage device, in parallel with the performing of the one or more first operations related to processing of the read request.

According to another aspect of the disclosure, there is provided a data storage device including: a controller configured to: receive, from a host device, a read request for reading data from the data storage device; identify a type of the read request; and based on the type of the read request being a random read request, perform one or more first operations related to processing of the read request in parallel with one or more second operations including: fetching a logical block address of the data from the read request; and obtaining a logical-to-physical (L2P) mapping table from a first memory associated with the data storage device, based on the logical block address, the L2P mapping table used for reading the data from the data storage device.

The read request may be stored in a queue in one of: a second memory associated with the host device or the first memory associated with the data storage device.

The controller may be configured to perform pre-defined processing of the read request including validation of the read request and allocating one or more resources to the read request.

The logical block address may include a start logical block address (LBA) and a number of logical blocks (NLB) of the data.

The controller may be further configured to obtain the L2P mapping table from the first memory associated with the data storage device by: converting the logical block address to a logical page number (LPN); and obtaining, based on the LPN, the L2P mapping table from the first memory associated with the data storage device.

The controller may be further configured to: based on the L2P mapping table being obtained, fetch the data from the data storage device, in parallel with the performing of the one or more first operations related to processing of the read request.

BRIEF DESCRIPTION OF DRAWINGS

The above and other objects and features of the disclosure will become apparent by describing in detail embodiments thereof with reference to the accompanying drawings.

It should be appreciated by those skilled in the art that any block diagram herein represents conceptual views of illustrative systems embodying the principles of the inventive concepts of the disclosure. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or operations does not include only those components or operations but may include other components or operations not expressly listed or inherent to such setup or device or method. In other words, one or more elements in a system or apparatus proceeded by "comprises . . . a" does not, without more constraints, preclude the existence of other elements or additional elements in the system or apparatus.

In operation of a data storage devices, a random read operation includes reading or writing files which may be scattered throughout a memory of a data storage device. Typically, there is a delay in reading the data for the random read operation, as a logical-to-physical (L2P) mapping table is extracted multiple times based on a read request from a host device. This leads to additional cost in loading the L2P mapping table.

According to an example embodiment, there is provided a method and a data storage device for managing host requests in the data storage device. When a read request is received from a host device, the data storage device needs to perform certain processing of the read request prior to reading the data to the host device. Here, the certain processing are pre-defined processing according to an example embodiment. Also, the L2P mapping table needs to be extracted which adds to latency in reading the data from the data storage device. According to an example embodiment of the disclosure, the data storage device detects a type of the read request to be a random read request, and performs the operations of obtaining the L2P mapping table in parallel to the pre-defined processing of the read request. Hence, the L2P mapping table can be obtained in advance when pre-defined processing is performed in parallel to reduce the latency. Further, the data of the host device can also be fetched in advance in parallel to the pre-defined processing, when the L2P mapping table is obtained. Hence, when the pre-defined processing is completed, the data can be read immediately to transfer to the host device.

Figure 1:
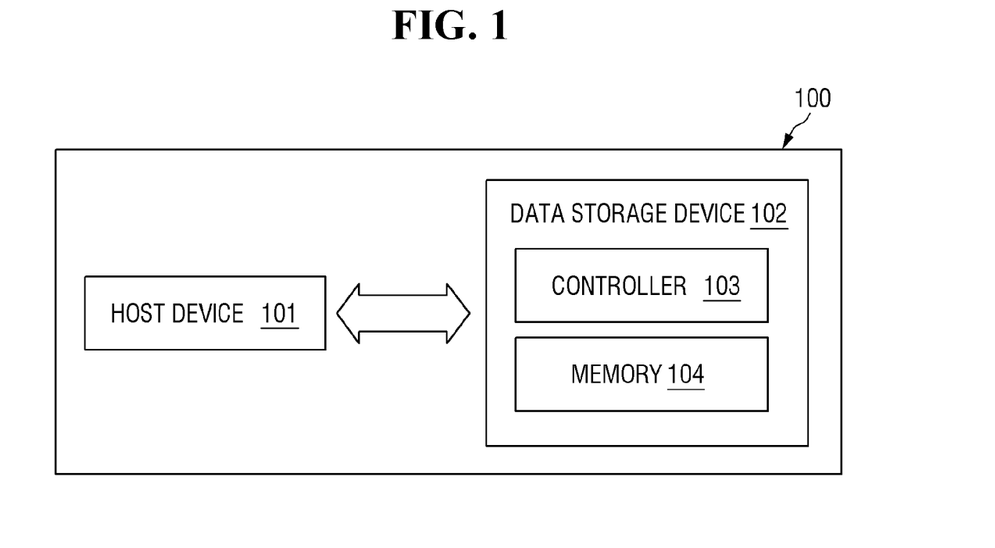
FIG. 1 illustrates an environment for managing host requests in a data storage device, in accordance with one or more example embodiments of the disclosure.

FIG. 1 illustrates an environment 100 for managing host requests in a data storage device according to one or more example embodiments. The environment 100 includes a host device 101 and a data storage device 102. The host device 101 may be any computing device that communicates with other host devices on a network. The host device 101 may include, a laptop computer, a desktop computer, a personal computer (PC), a notebook, a smartphone, a tablet, e-book readers, a server, a network server, a cloud-based server, and the like. The data storage device 102 stores data and/or instructions to be processed in the host device 101. The data storage device 102 includes a solid state drive (SSD), or a hard disk drive (HDD). However, the disclosure is not limited thereto, and as such, according to another example embodiment, other types of storage device may be provided. The SSD is a solid-state device that uses integrated circuit assemblies to store data persistently, typically using flash memory, and functions as secondary storage in the hierarchy of computer storage. The HDD is an electro-mechanical data storage device that stores and retrieves digital data using magnetic storage. According to an example embodiment, the data storage device 102 refers to the SSD. However, the disclosure is not limited thereto, and as such, according to another example embodiment, the data storage device may include any other similar data storage devices.

The data storage device 102 may include a controller 103 and a memory 104. The controller 103 is an electronic component of the data storage device 102 that acts as a bridge between the memory 104 and the host device 101. The controller 103 may be an embedded processor that executes firmware-level code and performs functions such as read and write, caching, error detection and correction. However, the disclosure is not limited thereto, and as such, according to another example embodiment, the controller 103 may be configured to perform other operations. The memory 104 stores the data of the host device 101. In an implementation, the memory 104 may include a volatile memory such as Dynamic Random Access Memory (DRAM). In another implementation, the memory 104 may include a non-volatile memory such as NAND flash memory. In yet another implementation, the memory 104 may include the volatile memory as a cache. However, the disclosure is not limited thereto, and as such, according to another example embodiment, any other memory types may be used in the data storage device 102. The host device 101 and the data storage device 102 may be connected via an interface. The interface may include an internal interface or an external interface. The interface may be implemented by using various interface schemes, but not limited to, an Advanced Technology Attachment (ATA), Serial ATA (SATA), external SATA (e-SATA), Small Computer Small Interface (SCSI), Serial Attached SCSI (SAS), Peripheral Component Interconnection (PCI), PCI express (PCIe), NVMe, IEEE 1394, a Universal Serial Bus (USB) interface, a Secure Digital (SD) card interface, a Multi-Media Card (MMC) interface, an eMMC interface, a Universal Flash Storage (UFS) interface, an embedded UFS (eUFS) interface, and a Compact Flash (CF) card interface.

The controller 103 may be configured to manage the host requests in the data storage device 102. According to an example embodiment, the controller 103 may receive a read request from the host device 101. The read request may be a request received for reading data from the data storage device 102. For example, the read request may be an instruction to read data from the data storage device 102. The controller 103 may determine a type of the read request. For example, the controller 103 may detect a type of the read request to be a random read request. According to an example embodiment, the controller 103 may obtain a Logical-to-Physical (L2P) mapping table from the memory in parallel with processing of the read request. For example, the controller 103 obtains the L2P mapping table from the memory in parallel with predefined processing of the read request. According to an example embodiment, the controller 103 may perform operations to obtain the L2P mapping table from the memory while simultaneously performing operations for processing of the read request. According to an example embodiment, the controller 103 may obtain the L2P mapping table by fetching a logical block address of the data from the read request, and obtaining, based on the logical block address, the L2P mapping table from the memory 104. For example, the controller 103 may first fetch a logical block address of the data from the read request, and thereafter obtain the L2P mapping table from the memory 104 based on the logical block address. Further, the controller 103 performs read to physical address in the memory 101 based on the L2P mapping table, for reading the data to the host device 101.

Figure 2:
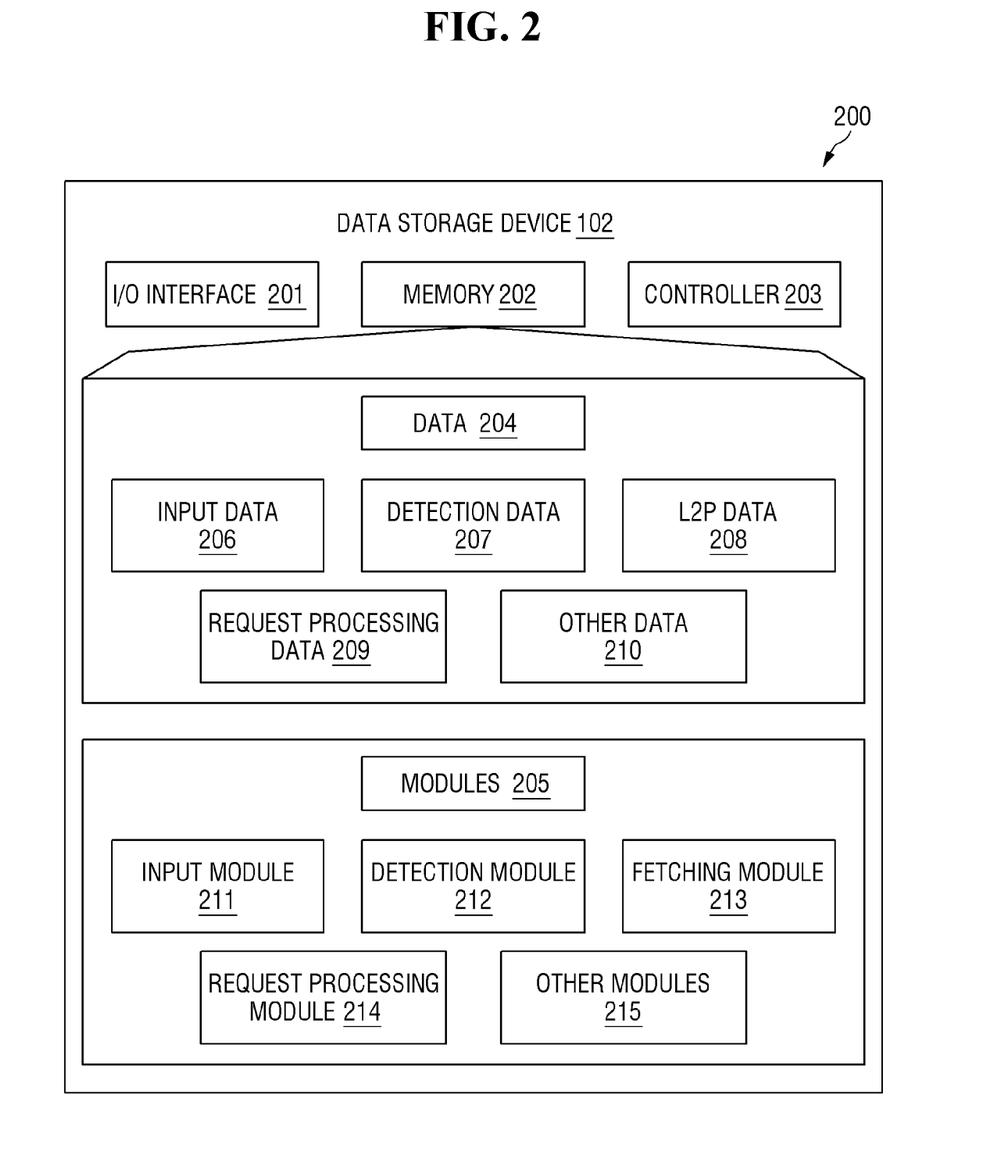
FIG. 2 illustrates a detailed diagram of a data storage device for managing host requests in the data storage device, in accordance with one or more example embodiments of the disclosure.

FIG. 2 illustrates a detailed diagram 200 of the data storage device 102 for managing the host requests in the data storage device 102, in accordance with an example embodiment of the disclosure. The data storage device 102 may include one or more Central Processing Units 203 (also referred as "CPUs", processor or "the controller 203"), Input/Output (I/O) interface 201, and a memory 202. In an example embodiment, the memory 202 may be communicatively coupled to the controller 203. The memory 202 stores instructions executable by the controller 203. The controller 203 may include at least one data processor for executing program components for executing user or system-generated requests. The memory 202 may be communicatively coupled to the controller 203. The memory 202 stores instructions, executable by the controller 203, which, on execution, may cause the controller 203 to manage the host requests in the data storage device 102. In an example embodiment, the memory 202 may include one or more modules 205 and data 204. According to an example, embodiment, the one or more modules 205 may be configured to perform the operations to manage the host requests in the data storage device 102. For example, the one or more modules 205 may be configured to use the data 204, and perform the operations to manage the host requests in the data storage device 102 using the data 204. In an example embodiment, each of the one or more modules 205 may be a hardware which may be outside the memory 202 and coupled with the data storage device 102. As used herein, the term modules 205 may include, but is not limited to, an Application Specific Integrated Circuit (ASIC), an electronic circuit, a Field-Programmable Gate Arrays (FPGA), Programmable System-on-Chip (PSoC), a combinational logic circuit, and/or other suitable components that provide described functionality. According to an example embodiment, one or more of the modules 205 may be implemented by software or a combination of hardware and software. According to an example embodiment, the one or more modules 205 when configured with the described functionality defined in the disclosure will result in a novel hardware, or may be considered as a special purpose processor. However, the disclosure is not limited thereto, and as such, the disclosure may be implemented in another way according to various other example embodiment. Further, the I/O interface 201 is coupled with the controller 203 through which an input signal or/and an output signal is communicated. For example, the data storage device 102 may receive the read request from the host device 101 via the I/O interface 201. The I/O interface 201 may include an internal interface or an external interface. In an example embodiment, the data storage device 102 may be coupled with a variety of computing systems, such as a laptop computer, a desktop computer, a Personal Computer (PC), a notebook, a smartphone, a tablet, e-book readers, a server, a network server, a cloud-based server, and the like.

According to an example embodiment, the modules 205 may include, for example, an input module 211, a detection module 212, a fetching module 213, a request processing module 214, and other modules 215. It will be appreciated that such aforementioned modules 205 may be represented as a single module or a combination of different modules. In one implementation, the data 204 may include, for example, input data 206, detection data 207, L2P data 208, request processing data 209, and other data 210.

Figure 3:
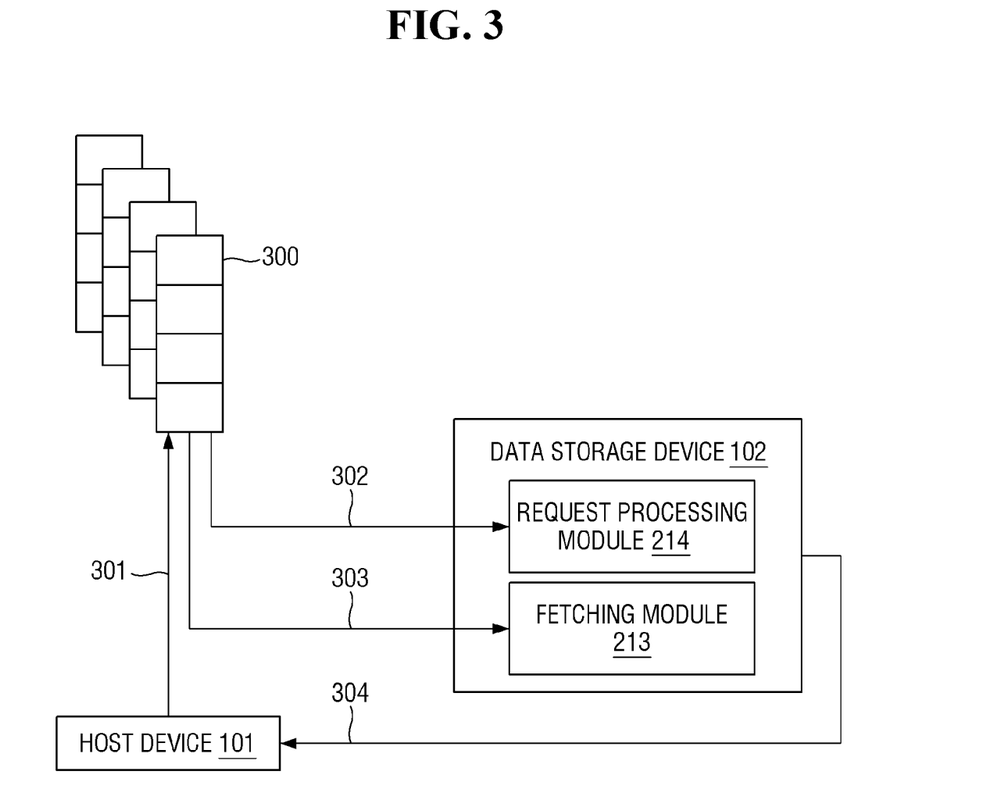
FIG. 3 illustrates a block diagram for managing host requests in a data storage device, in accordance with one or more example embodiments of the disclosure.

In an example embodiment, the input module 211 may be configured to receive the read request from the host device 101. The data of the host device 101 may be stored in the data storage device 102. For example, the data of the host device 101 may include data related to one or more applications running in the host device 101. The host device 101 may transmit the read request to the data storage device 102 for reading the data from the data storage device 102. The input module 211 may submit the read request in a queue. In an example embodiment, the queue may be an I/O submission queue which includes a circular buffer with a fixed slot size that the host device 101 uses to submit read requests for execution by the controller 103. In an example embodiment, the read request may be stored in the queue in one of, a memory associated with the host device 101 and the memory 104 associated with the data storage device 102. The read request received from the host device 101 may be stored as the input data 206 in the memory 202. Referring to FIG. 3, block 300 illustrates an example embodiment of an I/O submission queue in which the read requests of the host device 101 are stored. As described above, the host device 101 may transmit the read request to the data storage device 102. As shown in 301, the read request may be stored in the I/O submission queue 300.

In an example embodiment, the detection module 212 may be configured to receive the input data 206 from the input module 211. Further, the detection module 212 may be configured to detect a type of the read request. The read request received from the host device 101 may be one of a sequential read request and the random read request. The sequential read request includes a request for reading blocks of data. The random read request includes a request for reading small files which may be scattered throughout the data storage device 102. In an example embodiment, the detection module 212 may detect the type of the read request based on one or more parameters of the read request. For example, the one or more parameters may include sequentiality, sequential run length, request size, and the other parameters indicating characteristics of the sequential read request or the random read request. According to an example embodiment, any known detections methods other than the above-mentioned method may be used to detect the type of the read request. A result of the detection may be stored as the detection data 207 in the memory 202.

In an example embodiment, the fetching module 213 may be configured to receive the input data 206 from the input module 211 and detection data 207 from the detection module 212. Further, the fetching module 213 may be configured to perform operations for obtaining of the L2P mapping table in parallel with the pre-defined processing of the read request. The request processing module 214 may be configured to perform the pre-defined processing of the read request, once the read request is submitted in the queue. The pre-defined processing of the read request may include performing validation of the read request and allocating one or more resources to the read request. The validation of the read request may include parsing the read request, checking for hazards, etc. However, the disclosure is not limited thereto, and as such, according to another example embodiment, the validation of the read request may include other operations for validating the read request. The fetching module 213 may fetch a logical block address of the data from the read request in parallel with the processing of the read request. The logical block address may include a start Logical Block Address (LBA) and a Number of Logical Blocks (NLB) of the data. Further, the fetching module 213 may convert the logical block address to a Logical Page Number (LPN). Then, the fetching module 213 may obtain the L2P mapping table from the memory 104, based on the LPN. Referring to FIG. 3 again, the request processing module 214 may perform the pre-defined processing of the read request, as shown in 302. The fetching module 213 may perform the obtaining of the L2P mapping table in parallel with the processing of the read request, as shown in 303. The L2P mapping table may be stored as the L2P data 208 in the memory 202. In an example embodiment, the fetching module 213 may be further configured to fetch the data from the data storage device 102, in parallel with the pre-defined processing of the read request, when the L2P mapping table is obtained. For example, the fetching module 213 may complete fetching of the L2P mapping table. However, the request processing module 214 may still be performing the pre-defined processing of the read request. Thus, the fetching module 213 may fetch the data from the data storage device 102, in parallel with the pre-defined processing of the read request, to keep the data ready. In an example embodiment, the fetching module 213 may store the data in a read buffer until the pre-defined processing of the read request is completed and prior to transfer of the data to the host device 101. Then, the data may be transferred to the host device 101, as shown in 304. According to an example embodiment, the fetching module 213 is an independent module, which functions in parallel with the request processing module 214. The fetching module 213 may be implemented in any suitable hardware, software, firmware, or combination thereof.

The other data 210 may store data, including temporary data and temporary files, generated by the one or more modules 205 for performing the various functions of the data storage device 102. The one or more modules 205 may also include the other modules 215 to perform various miscellaneous functionalities of the data storage device 102. The other data 210 may be stored in the memory 202. It will be appreciated that the one or more modules 305 may be represented as a single module or a combination of different modules.

Figure 4:
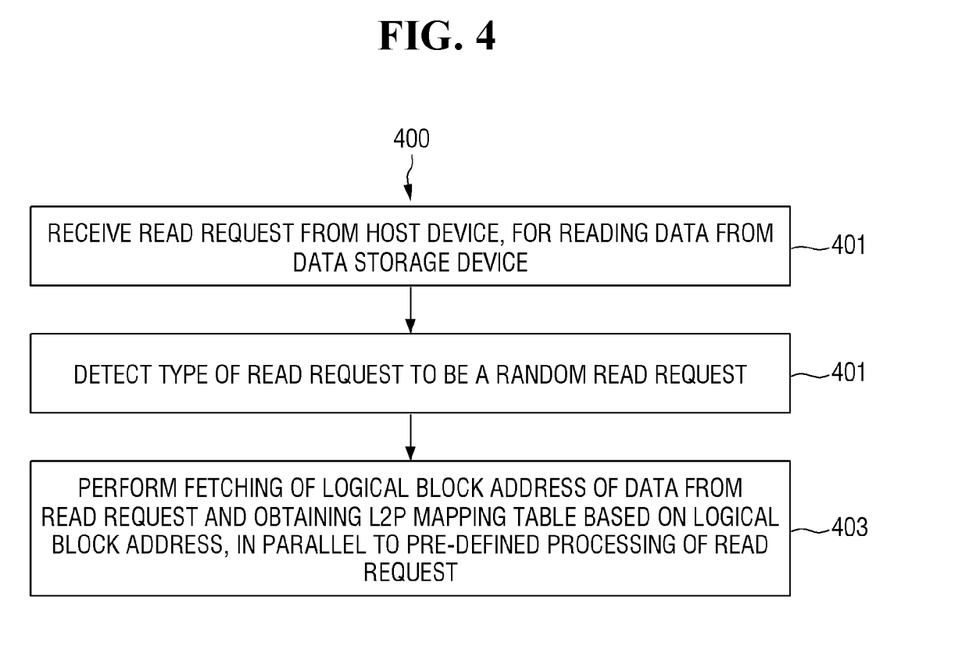
FIG. 4 shows a flow chart illustrating method operations for managing host requests in a data storage device, in accordance with one or more example embodiments of the disclosure.

FIG. 4 shows a flow chart illustrating method operations for managing the host requests in the data storage device 102, in accordance with an example embodiment of the disclosure. As illustrated in FIG. 4, the method 400 may include one or more operations. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At operation 401, the controller 103 may receive the read request from the host device 101. The host device 101 may transmit the read request to the data storage device 102 for reading the data from the data storage device 102. The controller 103 may submit the read request in the queue. In an example embodiment, the read request may be stored in the queue in one of, a memory associated with the host device 101 and the memory 104 associated with the data storage device 102.

At operation 402, the controller 103 may detect a type of the read request to be a random read request. The read request received from the host device 101 may be one of the sequential read request and the random read request. In an example embodiment, the controller 103 may detect the type of the read request based on one or more parameters of the read request. For example, the one or more parameters may include sequentiality, sequential run length, request size, and/or other parameters indicating characteristics of the sequential read request or the random read request. According to an example embodiment, a known detection method may be used to detect the type of the read request.

At operation 403, the controller 103 may perform obtaining of the L2P mapping table in parallel with pre-defined processing of the read request. The controller 103 may be configured to perform the pre-defined processing of the read request, once the read request is submitted in the queue. The pre-defined processing of the read request may include performing validation of the read request and allocating one or more resources to the read request. The controller 103 may fetch the logical block address of the data from the read request in parallel with the processing of the read request. The logical block address may include a start Logical Block Address (LBA) and a Number of Logical Blocks (NLB) of the data. Further, the controller 103 may convert the logical block address to a Logical Page Number (LPN). Then, the controller 103 may obtain the L2P mapping table from the memory 104, based on the LPN. In an example embodiment, the controller 103 may be further configured to fetch the data from the data storage device 102, in parallel with the pre-defined processing of the read request, when the L2P mapping table is obtained.

Figure 5:
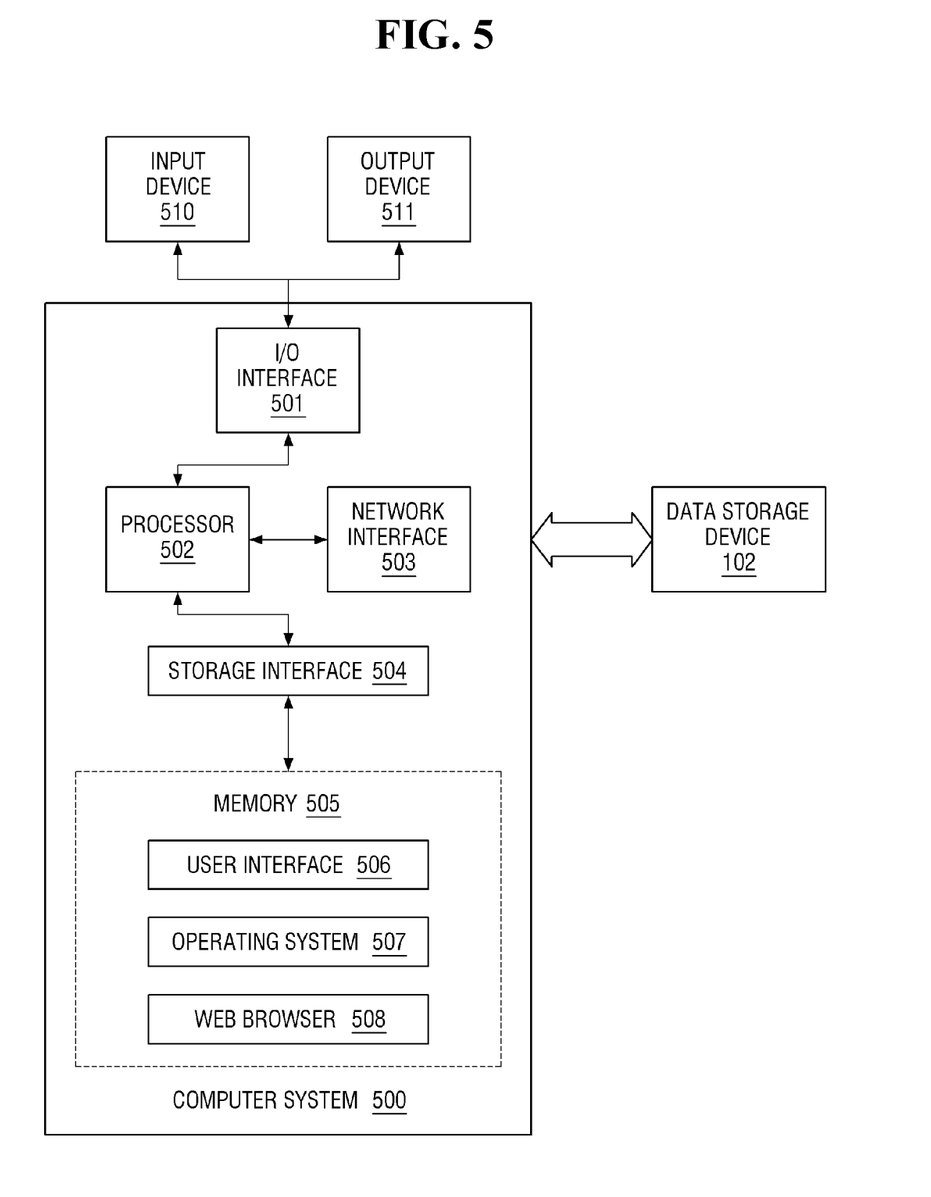
FIG. 5 shows a block diagram of a computing system for managing host requests in a data storage device, in accordance with one or more example embodiments of the disclosure.

FIG. 5 illustrates a block diagram of a computer system 500 for implementing example embodiments consistent with the disclosure. In an example embodiment, the computer system 500 may include the data storage device 102. Thus, the computer system 500 may be used to manage the host requests in the data storage device 102. The computer system 500 and the data storage device 102 may be connected via an interface. The interface may include an internal interface or an external interface. The computer system 500 may include a Central Processing Unit 502 (also referred as "CPU", "processor 502" or a controller). The processor 502 may include at least one data processor. The processor 502 may include specialized processing units such as integrated system (bus) controllers, memory management control units, floating point units, graphics processing units, digital signal processing units, etc.

The processor 502 may be configured to communicate with one or more input/output (I/O) devices via I/O interface 501. The I/O interface 501 may employ communication protocols/methods such as, without limitation, audio, analog, digital, monoaural, RCA, stereo, IEEE (Institute of Electrical and Electronics Engineers)-1394, serial bus, universal serial bus (USB), infrared, PS/2, BNC, coaxial, component, composite, digital visual interface (DVI), high-definition multimedia interface (HDMI), Radio Frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device 510 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 511 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

The processor 502 may be configured to communicate with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In an example embodiment, the processor 502 may be configured to communicate with a memory 505 (e.g., RAM, ROM, etc.) via a storage interface 504. The storage interface 504 may connect to memory 505 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507, web browser 508 etc. In an example embodiment, computer system 500 may store user/application data, such as, the data, variables, records, etc., as described in this disclosure. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLER ANDROID™, BLACKBERRY® OS, or the like.

In an example embodiment, the computer system 500 may implement the web browser 508 stored program component. The web browser 508 may be a hypertext viewing application, for example MICROSOFT® INTERNET EXPLORER™, GOOGLER CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX™, DHTML™, ADOBE® FLASH™, JAVASCRIPT™, JAVA™, Application Programming Interfaces (APIs), etc. In an example embodiment, the computer system 500 may implement a mail server stored program component. The mail server may be an Internet mail server such as Microsoft Exchange, or the like. The mail server may utilize facilities such as ASP™ ACTIVEX™, ANSI™ C++/C#, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In an example embodiment, the computer system 500 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the disclosure. A computer-readable storage medium refers to any type of physical memory on which information or data readable by a processor may be stored. Thus, a computer-readable storage medium may store instructions for execution by one or more processors, including instructions for causing the processor(s) to perform operations or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, Compact Disc Read-Only Memory (CD ROMs), Digital Video Disc (DVDs), flash drives, disks, and any other known physical storage media.

According to an example embodiment of the disclosure, there is provided a method and a data storage device for managing host requests in the data storage device. When a read request is received from a host device, the data storage device needs to perform certain pre-defined processing of the read request prior to reading the data to the host device. Also, the L2P mapping table needs to be extracted which adds to latency in reading the data from the data storage device. As such, according to an example embodiment, the data storage device detects a type of the read request to be a random read request. Then, the data storage device performs the operations of obtaining the L2P mapping table in parallel with the pre-defined processing of the read request. Hence, the L2P mapping table can be obtained in advance when pre-defined processing is performed in parallel with reduce the latency. Further, the data of the host device can also be fetched in advance in parallel with the pre-defined processing, when the L2P mapping table is obtained. Hence, when the pre-defined processing is completed, the data can be read immediately to transfer to the host device.

In the above example embodiments, components according to example embodiments of the disclosure are referenced by using modules or units. The modules or units may be implemented with various hardware devices, such as an integrated circuit, an application specific integrated circuit (ASIC), a field programmable gate array (FPGA), and a complex programmable logic device (CPLD), firmware driven in hardware devices, software such as an application, or a combination of a hardware device and software. Also, the modules or units may include circuits implemented with semiconductor elements in an integrated circuit, or circuits enrolled as an intellectual property (IP).

The terms "an example embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an example embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 shows certain events occurring in a certain order. In alternative embodiments, certain operations may be performed in a different order, modified, or removed. Moreover, operations may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method for managing host requests in a data storage device, the method comprising:
   receiving, from a host device, a read request for reading data from the data storage device, the read request comprising one or more first operations and one or more second operations;
   identifying a type of the read request; and
   based on the type of the read request being a random read request, performing one or more first operations related to processing of the read request in parallel with one or more second operations comprising:
      fetching a logical block address of the data from the read request; and
      obtaining a logical-to-physical (L2P) mapping table from a first memory associated with the data storage device, based on the logical block address, the L2P mapping table used for reading the data from the data storage device,
   wherein the one or more first operations are different from data fetching operations for fetching the data, and
   wherein the method further comprises:
      fetching the data from the data storage device based on the L2P mapping table; and
      storing the data in a read buffer until the one or more first operations related to the read request is completed.

2. The method as claimed in claim 1, wherein the read request is stored in a queue in one of a second memory associated with the host device and the first memory associated with the data storage device.

3. The method as claimed in claim 1, wherein the performing the one or more first operations related to processing of the read request comprises performing pre-defined processing of the read request comprising validation of the read request and allocating one or more resources to the read request.

4. The method as claimed in claim 1, wherein the logical block address comprises a start logical block address (LBA) and a number of logical blocks (NLB) of the data.

5. The method as claimed in claim 1, wherein the obtaining the L2P mapping table from the first memory associated with the data storage device comprises:
   converting the logical block address to a logical page number (LPN); and
   obtaining, based on the LPN, the L2P mapping table from the first memory associated with the data storage device.

6. The method as claimed in claim 1, further comprising:
   based on the L2P mapping table being obtained, fetching the data from the data storage device, in parallel with the performing of the one or more first operations related to processing of the read request.

7. A data storage device comprising:
   a controller configured to:
      receive, from a host device, a read request for reading data from the data storage device, the read request comprising one or more first operations and one or more second operations;
      identify a type of the read request; and
         based on the type of the read request being a random read request, perform the one or more first operations related to processing of the read request in parallel with the one or more second operations comprising:
            fetching a logical block address of the data from the read request; and
            obtaining a logical-to-physical (L2P) mapping table from a first memory associated with the data storage device, based on the logical block address, the L2P mapping table used for reading the data from the data storage device,
   wherein the one or more first operations are different from data fetching operations for fetching the data, and
   wherein the controller is configured to:
      fetch the data from the data storage device based on the L2P mapping table; and
      store the data in a read buffer until the one or more first operations related to the read request is completed.

8. The data storage device of claim 7, wherein the read request is stored in a queue in one of: a second memory associated with the host device or the first memory associated with the data storage device.

9. The data storage device of claim 7, wherein the controller is further configured to perform pre-defined processing of the read request comprising validation of the read request and allocating one or more resources to the read request.

10. The data storage device of claim 7, wherein the logical block address comprises a start logical block address (LBA) and a number of logical blocks (NLB) of the data.

11. The data storage device of claim 7, wherein the controller is further configured to obtain the L2P mapping table from the first memory associated with the data storage device by:
   converting the logical block address to a logical page number (LPN); and
   obtaining, based on the LPN, the L2P mapping table from the first memory associated with the data storage device.

12. The data storage device of claim 7, wherein the controller is further configured to:
   based on the L2P mapping table being obtained, fetch the data from the data storage device, in parallel with the performing of the one or more first operations related to processing of the read request.

13. The method as claimed in claim 1, wherein the one or more first operations comprises one or more validation operations for validating the read request.

14. The data storage device of claim 7, wherein the one or more first operations comprises one or more validation operations for validating the read request.

15. The method as claimed in claim 1, wherein the one or more first operations comprises parsing the read request.

16. The data storage device of claim 7, wherein the one or more first operations comprises parsing the read request.

17. The method as claimed in claim 1, wherein the one or more first operations comprises check for hazards related to the read request.

18. The data storage device of claim 7, wherein the one or more first operations comprises check for hazards related to the read request.

19. A method for managing host requests in a data storage device, the method comprising:
   receiving, from a host device, a read request for reading data from the data storage device;
   identifying a type of the read request; and
   based on the type of the read request being a random read request, performing one or more first operations to validate the read request in parallel with one or more second operations to fetch a logical block address of the data from the read request and obtain a logical-to-physical (L2P) mapping table from a first memory associated with the data storage device, based on the logical block address, the L2P mapping table used for reading the data from the data storage device,
   wherein the method further comprises:
      fetching the data from the data storage device based on the L2P mapping table; and
      storing the data in a read buffer until the one or more first operations related to the read request is completed.

* * * * *